United States Patent [19]

Tanaka et al.

[11] Patent Number: 5,413,875
[45] Date of Patent: May 9, 1995

[54] COPPER ALLOY SLIDING BEARING WITH HIGH-STRENGTH BACK METAL

[75] Inventors: Tadashi Tanaka, Konan; Masaaki Sakamoto, Nagoya; Koichi Yamamoto, Komaki; Tsukimitsu Higuchi, Gifu, all of Japan

[73] Assignee: Daido Metal Company Ltd., Nagoya, Japan

[21] Appl. No.: 135,987

[22] Filed: Oct. 14, 1993

[30] Foreign Application Priority Data

Dec. 25, 1992 [JP] Japan .................................. 4-346272

[51] Int. Cl.$^6$ .............................................. F16C 33/12
[52] U.S. Cl. ..................................... 428/645; 428/677; 384/912
[58] Field of Search ................ 428/644, 645, 677; 384/912

[56] References Cited

U.S. PATENT DOCUMENTS

| | | | |
|---|---|---|---|
| 4,877,696 | 10/1989 | Muto | 428/645 |
| 4,937,149 | 6/1990 | Mori | 428/645 |
| 5,075,177 | 12/1991 | Tanaka et al. | 428/650 |
| 5,112,416 | 5/1992 | Tanaka et al. | 428/654 |
| 5,185,216 | 2/1993 | Tanaka et al. | 428/645 |
| 5,298,336 | 3/1994 | Tanaka et al. | 428/552 |

FOREIGN PATENT DOCUMENTS 2243418 10/1991 United Kingdom .
2253016 8/1992 United Kingdom .

*Primary Examiner*—John Zimmerman
*Attorney, Agent, or Firm*—Browdy and Neimark

[57] ABSTRACT

A copper alloy sliding bearing of a three-layer structure comprises a steel back metal layer of a high strength, a copper alloy layer, and an overlay. The steel back metal layer contains 0.15-0.26% by weight of carbon, and the steel back metal layer has a 0.2% yield strength of not less than 440 N/mm$^2$. With this structure, even under severe conditions of use in an internal combustion engine of a high-speed design, in which an increased inertia force is applied to the housing, the followability of the bearing relative to the deformation of the housing is enhanced, and the bearing performance such as an anti-fretting property and an anti-seizure property is excellent.

4 Claims, No Drawings

COPPER ALLOY SLIDING BEARING WITH HIGH-STRENGTH BACK METAL

BACKGROUND OF THE INVENTION

This invention relates to a sliding bearing which exhibits excellent bearing properties even in a high-load range, that is, under severe conditions of use in a recent internal combustion engine designed to produce a high power.

A conventional copper alloy sliding bearing used in an internal combustion engine comprises three layers, that is, a steel back metal layer, a copper alloy layer and an overlay. The copper alloy layer, extensively used in high-speed, high-load engines, is composed of a Cu-Pb alloy or a Cu-Sn-Pb alloy, and the overlay is composed of a Pb-Sn alloy, a Pb-Sn-Cu alloy, or a Pb-Sn-In alloy.

In most cases, the steel back metal layer is composed of low-carbon steel whose carbon content is not more than 0.2%.

In recent internal combustion engines, the housing of the bearing is liable to be deformed by an inertia force because of the high-speed, high-load design of the engine. This deformation adversely affects the tight fit between the bearing and the housing, and damage, such as fatigue and seizure due to fretting (which means a surface damage developing when a slight relative motion is periodically repeated between two contact surfaces) or migration (which means a phenomenon that Cu-plating, flash-plating and carbide concentrate locally as a result of a periodic relative motion), develops. Therefore, it is necessary that the steel back metal layer of the bearing should be made of a hard, high-strength material, and that a larger interference should be provided when mounting the bearing on the housing so as to enhance the degree of tight fit of the bearing as well as the followability of the bearing (high "followability" of a bearing means that the bearing is able to be followable to the high level of deformation of a housing in which the bearing is fitted, so that the bearing can keep a satisfactorily fitting state on the housing even when the housing is deformed in a high degree) relative to the deformation of the housing. However, the conventional bearing having the steel back metal layer made of low-carbon steel has not been found entirely satisfactory in that it is low in strength, and will yield when the bearing is mounted on the housing with a large interference.

SUMMARY OF THE INVENTION

It is therefore an object of this invention to provide a copper alloy sliding bearing of the type which has a high strength, can tightly fit in a housing, and can suitably follow the deformation of the housing so that the bearing can be suitably used in a high-speed, high-load engine.

A copper alloy sliding bearing of the present invention includes back metal of a high strength in order to meet a high-speed, high-load design of an internal combustion engine.

More specifically, according to the present invention, there is provided a copper alloy sliding bearing which comprises a steel back metal layer of a high strength, a copper alloy layer, and an overlay, the steel back metal layer containing 0.15-0.26% by weight of carbon, and the steel back metal layer having a 0.2% yield strength of not less than 440 N/mm$^2$. The steel back metal layer may be plated with copper.

Preferably, the copper alloy layer consists, by weight, of 15-30% Pb, 0.5-8% Sn, and the balance Cu and incidental impurities.

Preferably, the overlay consists, by weight, of 3-18% Sn, at least one kind selected from the group consisting of not more than 15% In and not more than 3% Cu, and the balance Pb.

A method of producing the above sliding bearing comprises the steps of applying copper alloy powder onto steel back metal; and repeatedly sintering and rolling the copper alloy powder, applied on the steel back metal, to form a bimetal, the total rolling reduction of the back metal portion in the repeated rolling operation being 10-35%, and the 0.2% yield strength of the steel back metal being not less than 440 N/mm$^2$.

The reasons for the aforementioned parameters, as well as effects thereof, will be explained below.

(1) Steel back metal (a) 0.2% yield strength of not less than 440 N/mm$^2$

If this yield strength is less than 440 N/mm$^2$, the bearing, when mounted on the housing, will yield when a larger interference is provided, so that the tight fit of the bearing in the housing is adversely affected.

(b) Carbon content of 0.15-0.26%

If the carbon content is less than 0.15%, the 0.2% yield strength of not less than 440 N/mm$^2$ is not obtained when the rolling reduction is low. In contrast, if this content is more than 0.26%, a load during the rolling operation of the bimetal becomes large, and the number of times of rolling operation increases, which results in an increased cost.

(2) Copper alloy (a) Pb content of 15-35%

If this content is less than 15%, the anti-seizure property and embedability are inferior. In contrast, if this content is more than 30%, the alloy strength is lowered, and is inferior in fatigue resistance.

(b) Sn content of 0.5-8%

If this content is less than 0.5%, the strength of the alloy is insufficient. In contrast, if this content is more than 8%, the thermal conductivity is lowered, so that the anti-seizure property is inferior.

(3) Overlay (a) Sn content of 3-18%

If this content is less than 3%, the strength is insufficient, and also a corrosion resistance is inferior. In contrast, if this content is more than 18%, the melting point is undesirably lowered, and a wiping phenomenon (melting and flowing phenomenon) is liable to occur.

(b) In content of not more than 15%

In enhances wear resistance and a corrosion resistance; however, if this content is more than 15%, the temperature at which the melting begins is lowered, and the wiping phenomenon (phenomena of melting and flowing) is liable to occur.

(c) Cu content of not more than 5%

Cu enhances wear resistance and fatigue resistance; however, if this content is more than 5%, the overlay becomes undesirably hard and brittle.

(4) Total rolling reduction of back metal portion in repeated rolling operation: 10-35%

If this rolling reduction is less than 10%, the 0.2% yield strength of not less than 440 N/mm$^2$ can not be obtained. In contrast, if this rolling reduction is more than 35%, the likelihood undesirably increases that the mechanical strength of the alloy is lowered.

DESCRIPTION OF THE PREFERRED EMBODIMENTS

The embodiment of the present invention will now be illustrated by way of the following Examples.

There were prepared steel back metals having respective compositions shown in Table 1, the steel back metals having a thickness of 1.3–1.8 mm and a width of 150 mm. Alloy powder (Cu-Sn3.5%-Pb23%) having a grain size of not more than 250 μm was spread onto each of the steel back metals, and was sintered at temperatures of 700°–900° C. for 10–30 minutes in a reducing atmosphere using hydrogen gas, to provide a composite sintered material. Then, the composite sintered material was reduced in thickness through rolling, and was sintered again, and then was rolled again (re-rolled) to provide a sintered bimetal having an overall thickness of 1.60 mm, which sintered bimetal had a back metal layer of a thickness of 1.25 mm. The above re-rolling may be repeated a necessary number of times so that the total thickness reduction rate is 10–35%.

Table 1 shows the composition of the steel back metals of the thus prepared bimetals, the total rolling reduction of the back metal portions in the rolling operation, the hardness, a tensile strength, and a 0.2% yield strength.

Subsequently, each of the bimetals was formed into a bearing of a semi-circular shape by pressing and machining. Then, the semi-circular bearing was degreased and pickled, and an overlay (Pb-Sn9%-In9%) having a thickness of 20 μm was formed on the semi-circular bearing by electroplating. In this manner, products (Nos. 1 to 4) of the present invention and conventional products (Nos. 5 to 8) were prepared.

In order to confirm a change in height of the thus obtained sliding bearings after these bearings were mounted on a housing and used, each sliding bearing was subjected to a test, in which a shaft borne by the sliding bearing was rotated at a speed of 9000 rpm at a bearing pressure of 300 kgf/cm² for 20 hours after the sliding bearing had been subjected to running-in for one hour, the circumferential speed of the shaft being 25 m/sec. Details of conditions of the test are shown in Table 2, and the amount of change in height is shown in Table 3.

TABLE 2

| Items | (Conditions of Test) Condition | Unit |
|---|---|---|
| Shaft diameter | 53 | mm |
| Width of bearing | 16 | mm |
| Rotational speed | 9000 | rpm |
| Circumferential speed | 25 | m/sec |
| Specific Load | 300 | kgf/cm² |
| Test time | 20 | Hr |
| Lubricating oil | Machine oil 22 | — |
| Oil inlet temperature | 100~110 | °C. |
| Rate of oil supply | 150 | cc/min |
| Material of shaft | S45C | JIS |
| Roughness of shaft | 0.4–0.6 | $R_{max}$ μm |

TABLE 3

| Kind | (Results of Test) No. | Amount of height of change (μm)* |
|---|---|---|
| Products of invention | 1 | 5 |
|  | 2 | 5 |
|  | 3 | 4 |
|  | 4 | 4 |
| Conventional products | 5 | 20 |
|  | 6 | 15 |
|  | 7 | 15 |
|  | 8 | 18 |

*The amount of change of height of the bearing after it was mounted on the housing and used.

As described above, in the sliding bearings of the present invention, the carbon content of the back metal is limited to the specific value, and the rolling reduction in the rolling operation is increased. With this arrangement, the sliding bearings of the present invention exhibit excellent properties such as an anti-fretting property and an anti-seizure property even under severe conditions of use in an internal combustion engine as under such a condition in which an increased inertia force is applied to the housing in a high-speed range of the engine. Such an excellent performance has not been achieved with conventional multi-layer sliding bearings.

What is claimed is:

1. A copper alloy sliding bearing of three-layer structure, comprising a steel back metal layer of a high strength or a copper-plated steel back metal layer of a high strength, a copper alloy layer, and an overlay, said steel back metal layer containing 0.15–0.26% by weight of carbon, and
    said steel back metal layer having a 0.2% yield strength of not less than 440 N/mm², a tensile strength of not more than 624 N/mm² and not less than 490 N/mm², and a hardness of 160 to 200 Hv.

2. A copper alloy sliding bearing according to claim 1, in which said copper alloy layer consists, by weight, of 15–30% Pb, 0.5–8% Sn, and the balance Cu and incidental impurities.

TABLE 1

| Kind | No. | Composition of back metal (wt. %) C | Mn | Fe | Total rolling reduction of back metal portion in rolling operation (%) | Vickers Hardness (Hv 10) | Tensile strength (N/mm²) | 0.2% yield strength (N/mm²) |
|---|---|---|---|---|---|---|---|---|
| Products of invention | 1 | 0.16 | 0.60 | balance | 10 | 160 | 490 | 451 |
|  | 2 | 0.19 | 0.68 | balance | 11 | 163 | 510 | 461 |
|  | 3 | 0.19 | 0.68 | balance | 18 | 184 | 585 | 506 |
|  | 4 | 0.19 | 0.68 | balance | 30 | 200 | 624 | 529 |
| Conventional Products | 5 | 0.19 | 0.68 | balance | 4 | 146 | 468 | 334 |
|  | 6 | 0.19 | 0.68 | balance | 8 | 158 | 483 | 426 |
|  | 7 | 0.11 | 0.40 | balance | 9 | 137 | 420 | 391 |
|  | 8 | 0.05 | 0.29 | balance | 11 | 131 | 385 | 369 |

3. A copper alloy sliding bearing according to claim 1, in which said overlay consists of Sn in an amount of 3–18% by weight, at least one of In and Cu in an amount of greater than zero and not more than 15% In and greater than zero and not more than 5% Cu, and the balance Pb.

4. A copper alloy sliding bearing according to claim 2, in which said overlay consists of Sn in an amount of 3–18% by weight, at least one of In and Cu in an amount of greater than zero and not more than 15% In and greater than zero and not more than 5% Cu, and the balance Pb.

* * * * *